Sept. 13, 1949.　　　　W. R. OLSON　　　　2,482,022
FISH BOX FOR ANGLERS
Filed Oct. 21, 1947　　　　　　　　　　2 Sheets-Sheet 1
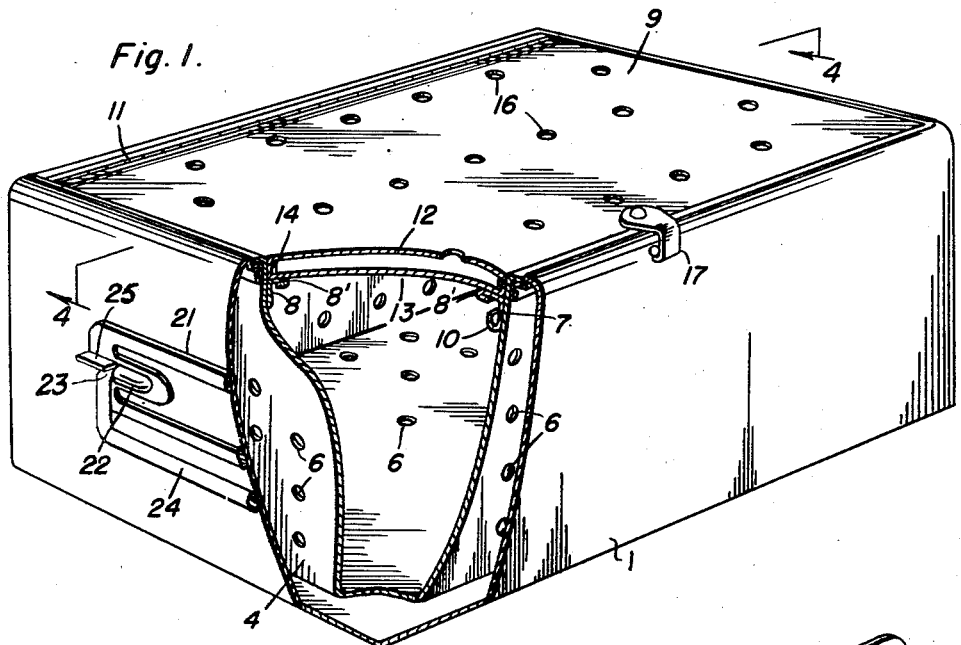
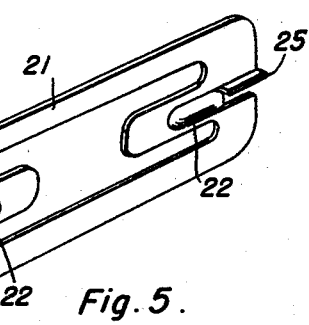
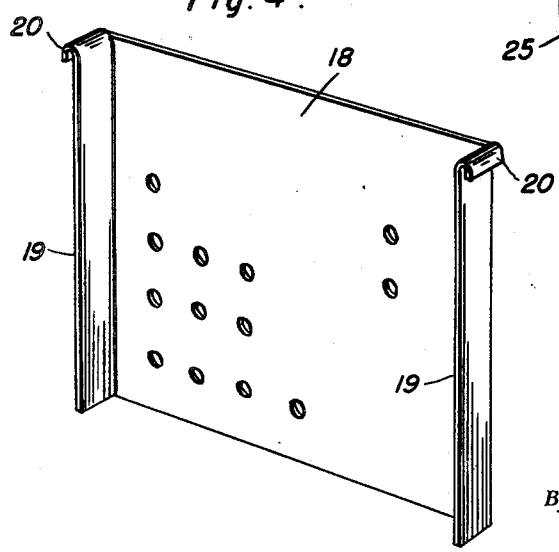
Inventor
Walter R. Olson Sept. 13, 1949.  W. R. OLSON  2,482,022
FISH BOX FOR ANGLERS
Filed Oct. 21, 1947  2 Sheets-Sheet 2
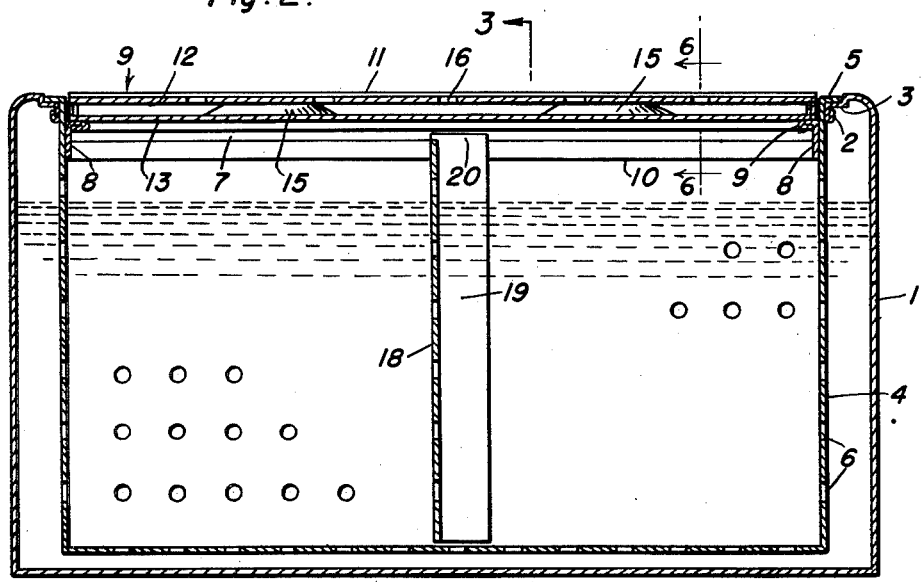
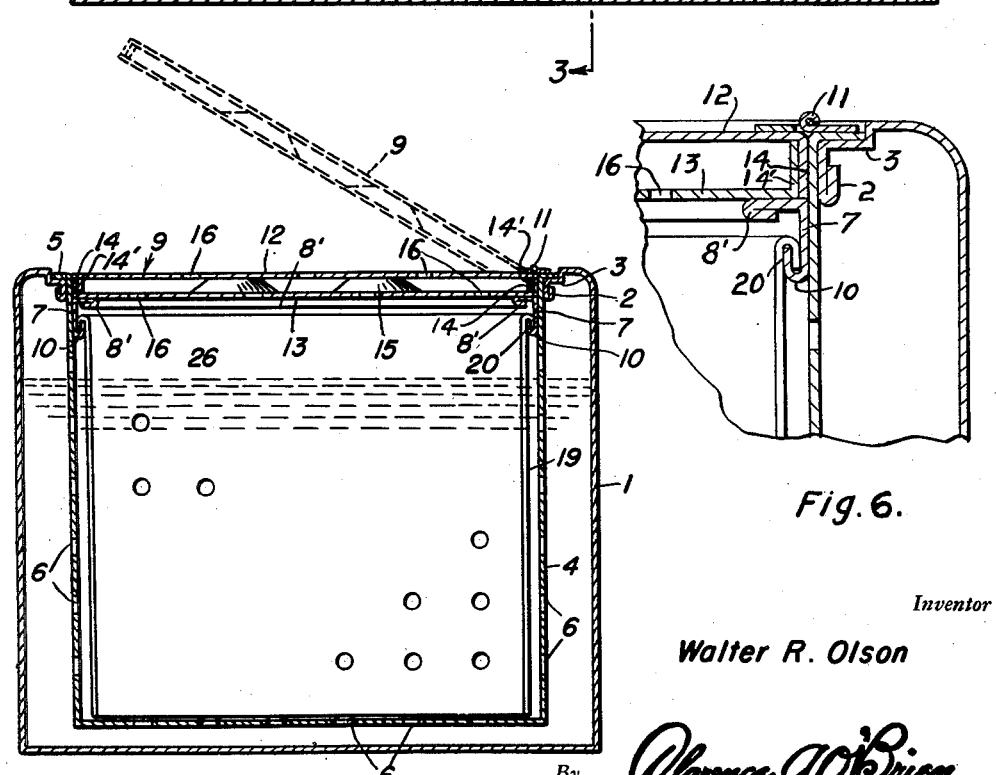
Inventor
Walter R. Olson Patented Sept. 13, 1949

2,482,022

UNITED STATES PATENT OFFICE 2,482,022

FISH BOX FOR ANGLERS

Walter R. Olson, Racine, Wis.

Application October 21, 1947, Serial No. 781,097

3 Claims. (Cl. 43—55)

My invention relates to improvements in fish boxes for anglers, the primary object in view being to provide a simply constructed, inexpensive and practical box for anglers adapted for carrying either live minnows or other similar bait or caught fish, and maintaining the same alive and fresh for a maximum length of time.

Another object is to provide a device of the character indicated embodying compartments for keeping different kinds of bait, fish or the like, alive and fresh in water and segregated, the compartments being variable in size as desired.

Another object is to provide a fish box for the purposes above indicated especially adapted for maintaining water well aerated and therefore cool.

Other and subordinate objects, also comprehended by my invention, together with the precise nature of my improvements will be readily understood when the succeeding description and claims are read with reference to the drawings accompanying and forming part of this specification.

In said drawings—

Figure 1 is a view in perspective of my improved fish box in a preferred embodiment thereof partly broken away and shown in section;

Figure 2 is a view in longitudinal vertical section;

Figure 3 is a view in transverse section taken on the line 3—3 of Figure 2 with the cover shown partly open in dotted lines;

Figure 4 is a view in perspective of the partition panels;

Figure 5 is a view in perspective of one of the handle keeper plates; and

Figure 6 is a fragmentary view in transverse section taken on the line 6—6 of Figure 2 and drawn to a larger scale.

Referring now to the drawings by numerals, my improved fish box, as shown, comprises an outer container 1, preferably of elongated rectangular form, with an internal rim flange 2 of right angle form, in cross section, extending around the top of said container and offset inwardly and downwardly, equidistantly, from the sides and ends of the container 1 to form a flat depressed ledge 3 around said rim.

An inner container 4, also elongated and rectangular, and relatively shallower than said container 1, is provided to fit in the flange 2 and with an external, lateral, rim flange 5 extending around the same and fitting on the ledge 3 to suspend said inner container 4 in the outer container 1 spaced from the ends, sides and the bottom of said outer container, as best shown in Figures 2 and 3. Apertures 6 are provided in the sides and bottom of the inner container 4, also in the ends thereof, to admit water into said inner container 4 from said outer container 1. Rails 7 and 8 of right angled cross section are provided in the inner container 4 on the sides and ends thereof, the rails 7 to extend along said sides and the rails 8 to extend along said ends, both below the rim flange 5, said rails 7 and 8 providing an internal lateral ledge 8' in said inner container 4 extending around the same adjacent the upper edge thereof for supporting a cover 9, and the rails 7 on the sides of said inner container edge having lower channel edges 10 for supporting a partition panel 18, as described in detail in the following.

The cover 9 which fits in the top of the inner container 4 to rest on the ledges 8', is hollow and formed of top and bottom panel sections 12, 13 with right angled end flanges 14, 14' one section fitting in the other with the flanges 14, 14' thereof spacing the sections 12, 13 apart at the edges of said cover. Reinforcing bosses 15 on the bottom panel section 13 also space said sections 12, 13 apart. The panel sections 12, 13 may be secured together in any suitable manner. Transverse and longitudinal rows of air inlet apertures 16 are provided in the panel sections 12, 13 and are staggered in one section relative to those in the other section to prevent water from splashing upwardly through the cover 9, said apertures providing for aerating the water. A suitable type of hinge 11 at one side edge of the cover 9 suitably secured to the rim flange 5 at one side of the inner container 4 provides for opening and closing said cover 9. At the other side of said cover 9 is a suitable latch 17, holding said cover closed and for use in opening and closing said cover.

A foraminous partition and aerating panel 18 is provided to fit in the inner container 4 and depend from the channel edges 10 to substantially the bottom of said container. The partition panel 18 is formed with right angled, vertical, side flanges 19 for reinforcing purposes and which terminate in upper end hooks 20 fitting downwardly in the channel edges 10 and slidable along said edges so that the panel 18 is slidable along the inner container 4 into different positions. Preferably, the channel edges 10 grip the hooks 20 to prevent accidental displacement of said partition panel laterally out of set position.

Rectangular handle keeper plates 21, of skeleton form for reducing weight, are suitably secured to the ends of the outer container 1 to extend along said ends and are provided with end barrels 22 in which are fitted end trunnions 23 on a pair of bail handles 24 which are vertically swingable into laterally extending position. End stop ledges 25 bent up from said keeper plates 21 limit such swinging of said handles 24.

The entire box described, with the exception of the hinge 11 and the handles 24 may be formed of light strong sheet metal, or other suitable material.

The manner in which the box embodying my invention is adapted to be used will be readily understood. With water in the container 1, 4, as at 26, bait minnows, or the like, may be kept alive in the inner container 4 with different kinds of said bait upon different sides of the partition panel 18, and thus segregated. A plentiful supply of outside air is admitted to the water through the cover 9, in a manner which will be obvious, to maintain water 26 cool and fresh and thereby sustain life in the bait for a long time. The partition panel 18 may be adjusted along the inner container 4 to provide a pair of compartments of different sizes in said container, as desired. The ledge 8' keeps the hooks 20 from becoming disengaged from the edge channels 10. The inner container may be moved from the outer container 1 and set in a stream, or the like, while the outer container, with fresh water therein may be used for keeping the live fish caught by an angler. The cover 9 because of its hollow construction and apertures is adapted to be air cooled and this contributes toward maintaining the water 26 cool.

The foregoing will, it is believed, suffice to impart a clear understanding of my invention, without further explanation.

Manifestly, the invention, as desired, is susceptible of modification, without departing from the inventive concept, and right is herein reserved to such modifications as fall within the scope of the appended claims.

Having described the invention, what is claimed as new is:

1. A box for bait fish and the like comprising an outer container for water provided with an internal lateral rim flange, an inner removable container in the outer container perforated for the passage of water into the same from the outer container and fitting in said flange with an external rim flange resting on said internal flange, said flanges suspending said inner container spaced from the outer container to provide for the inner container being surrounded by the water in the outer container, rails extending along the sides and ends of the inner container within the same and parallel with the rim thereof, a cover fitted in said inner container to fit flush on said rails and being hollow and perforated for air cooling the same and aerating the water in the inner container, and a perforated partition in said inner container for dividing the same into compartments for different kinds of bait fish and to act as an aerating device and means supporting said panel on said sides of said inner container for adjustment laterally to vary the size of said compartments.

2. A box for bait fish and the like comprising an outer container for water provided with an internal lateral rim flange, an inner removable container in the outer container perforated for the passage of water into the same from the outer container and fitting in said flange with an external rim flange resting on said internal flange, said flanges suspending said inner container spaced from the outer container to provide for the inner container being surrounded by the water in the outer container, rails extending along the sides and ends of the inner container within the same and parallel with the rim thereof, a cover fitted in said inner container to fit flush on said rails and being hollow and perforated for air cooling the same and aerating the water in the inner container, and a perforated partition in said inner container for dividing the same into compartments for different kinds of bait fish and to act as an aerating device, and means supporting said panel on said sides of said inner container for adjustment laterally to vary the size of said compartments, said means comprising channel members on said sides and hooks on said panel.

3. A box for bait fish and the like comprising an outer container for water provided with an internal lateral rim flange, an inner removable container in the outer container perforated for the passage of water into the same from the outer container and fitting in said flange with an external rim flange resting on said internal flange, said flanges suspending said inner container spaced from the outer container to provide for the inner container being surrounded by the water in the outer container, rails extending along the sides and ends of the inner container within the same and parallel with the rim thereof, a cover fitted in said inner container to fit flush on said rails and being hollow and perforated for air cooling the same and aerating the water in the inner container, and a perforated partition in said inner container for dividing the same into compartments for different kinds of bait fish and to act as an aerating device, and means supporting said panel on said sides of said inner container for adjustment laterally to vary the size of said compartments, the perforations in said cover being staggered on the top and bottom thereof to prevent water from splashing upwardly therethrough.

WALTER R. OLSON.

REFERENCES CITED

The following references are of record in the file of this patent:

UNITED STATES PATENTS

| Number | Name | Date |
|---|---|---|
| 661,093 | Warren | Nov. 6, 1900 |
| 763,437 | Sobey | June 28, 1904 |
| 974,601 | Sampson et al. | Nov. 1, 1910 |
| 2,154,741 | Gray | Apr. 18, 1939 |
| 2,242,966 | Burkardt | May 20, 1941 |
| 2,403,858 | Groom et al. | July 9, 1946 |